(12) United States Patent
Berthier

(10) Patent No.: US 10,083,297 B2
(45) Date of Patent: Sep. 25, 2018

(54) METHOD OF SECURE COMPARATIVE PROCESSING

(71) Applicant: MORPHO, Issy-les-Moulineaux (FR)

(72) Inventor: Mael Berthier, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/413,696

(22) PCT Filed: Jul. 9, 2013

(86) PCT No.: PCT/EP2013/064489
§ 371 (c)(1),
(2) Date: Jan. 8, 2015

(87) PCT Pub. No.: WO2014/009371
PCT Pub. Date: Jan. 16, 2014

(65) Prior Publication Data
US 2015/0213261 A1    Jul. 30, 2015

(30) Foreign Application Priority Data

Jul. 10, 2012  (FR) .................................... 12 56621

(51) Int. Cl.
*G06F 21/00* (2013.01)
*G06F 21/55* (2013.01)
*G06F 21/75* (2013.01)

(52) U.S. Cl.
CPC .......... *G06F 21/556* (2013.01); *G06F 21/755* (2017.08); *G06F 2221/034* (2013.01); *G06F 2221/2123* (2013.01)

(58) Field of Classification Search
None
See application file for complete search history.

(56) References Cited

U.S. PATENT DOCUMENTS

2001/0018740 A1* 8/2001 Marukawa .................... 713/186
2011/0302418 A1* 12/2011 Fujisaki ....................... 713/179

FOREIGN PATENT DOCUMENTS

FR    2 813 468    3/2002

* cited by examiner

*Primary Examiner* — David Le
(74) *Attorney, Agent, or Firm* — Womble Bond Dickinson (US) LLP

(57) ABSTRACT

Method of secure comparative processing of the type in which a processor of an electronic component compares proof data (EPR, AUTH) that it receives as input with main secret data (CTRL, PIN) stored in said electronic component, characterized in that the processor implements, in addition to the comparison with the secret data (CTRL, PIN), complementary operations on the proof data (EPR, AUTH) which generate on the electronic component a variation of behavior which is dependent on the proof data (EPR, AUTH) which it receives as input and which is compounded with the behavioral variation related to the comparison with the main secret data (CTRL, PIN).

6 Claims, 1 Drawing Sheet

METHOD OF SECURE COMPARATIVE PROCESSING

FIELD OF THE INVENTION

The present invention relates to secure comparative treatment methods.

It applies advantageously in particular for securing comparison treatments which can be run on a smart card: authentication of PIN code for example, or even verifications of certificates.

PRIOR ART

Many electronic components carry out comparison operations between secret data and data to be submitted for comparison, hereinbelow called "test data". These comparison operations can be the object of attacks to determine said secret data.

Some of these attacks, called "side channels", consist of studying the performance of the component (for example a smart card), especially in terms of electromagnetic leaks, or even in terms of variations in electricity consumption, or response time.

In fact if, during comparison between a secret value and a test value, the test value corresponds to the secret value, the component will run operations different to other cases (triggering a determined program, etc.).

So by analysing some operating parameters of the component during successive comparisons, it is possible to point out differences in performance when subjected test data correspond to the secret data and therefore retrieve secret data.

Various solutions have been developed to ward off this type of attack.

These solutions comprise, for example, implementation of programs called "symmetrical", that is, similar in case of correspondence or not between the compared data, for example so that electricity consumption profiles of the system are identical.

Such a solution does however have disadvantage of being very difficult to run. Indeed, the success of the comparison necessarily involves a difference in treatment relative to a failure of this comparison.

Another solution has been to generate, in programs run during comparison or thereafter, in case of failure as in the case of success, random execution deadlines. Apart from the hindrance necessarily caused by these deadlines, this solution also has the disadvantage of being easily detectable by an attacker. In keeping with unsuccessful comparisons made, the latter can confirm the lack of particular signing of false identifiers (that is, secret data distinct from secret control data).

PRESENTATION OF THE INVENTION

As a consequence, the aim of the invention is to propose a secure authentication method more resistant to "side channel" attacks than secure methods of the prior art, and not having the disadvantages mentioned hereinabove.

In this respect, the invention proposes a secure comparative treatment method of the type in which a processor of an electronic component compares test data it receives at input to main secret data stored in said electronic component, characterized in that at the same time as comparison with the secret data, the processor runs complementary operations on the test data which generate on the electronic component a variation in performance which is a function of the test data it receives at input and which is added to the variation in performance linked to comparison with the main secret data.

It is accordingly evident that the leaks electromagnetic, variations in current, etc. . . . which can be noted by an external observer are linked to:
common operations which will be similar for all values subjected;
noises which will be different, irrespective of the comparison even by using the same value;
secret data (if the subjected value corresponds to the secret);
test data (variation in performance linked to the latter).

So, after de-noising, the leak or variation in total consumption is the sum of a common component, of a component linked to comparison with the secret data and a component linked to the complementary operations, which is a function of test data.

It is impossible for an external observer to distinguish in the variation in performance of the component what corresponds to comparison with the secret data and what corresponds to the complementary operations, which is a function of test data.

The invention also relates to an electronic authentication component comprising a memory in which main secret control data and additional control data are stored, and a processor, the electronic component being characterized in that the processor is adapted to run the method proposed.

DESCRIPTION OF FIGURES

Other characteristics, aims and advantages of the present invention will emerge from the following detailed description, with respect to the appended figures given by way of non-limiting examples and in which.

DETAILED DESCRIPTION OF EMBODIMENTS

Throughout the text, the purely illustrative scope of an authentication method of PIN codes is put in place, although other applications of secure comparative treatments are entirely feasible.

Figure 1:
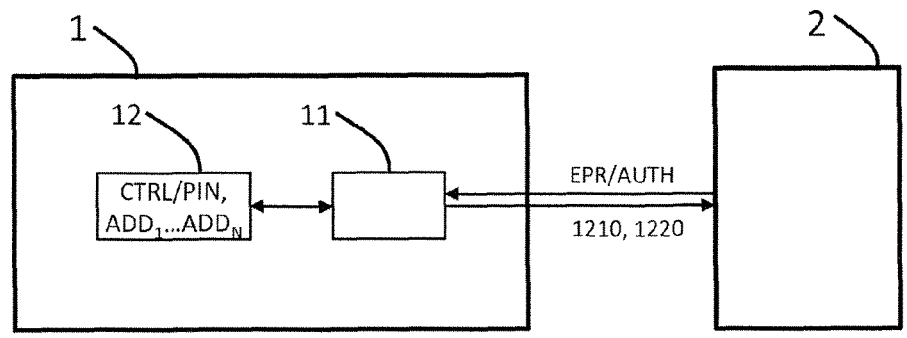
FIG. 1 schematically illustrates an example of a secure electronic authentication component and information exchange with an authentication terminal.

In reference to FIG. 1, this shows an electronic authentication component 1 for completing authentication by comparison between secret control data CTRL and test data EPR to be compared to control data, these data being for example authentication data AUTH. These data are numerical codes, for example.

This component 1 comprises electronics for conducting this comparison, for example a processor 11, adapted to communicate with a memory 12, in which the secret control data PIN are stored. The component 1 is for example of the smart card type.

The component 1 is also capable of dialoguing with a terminal 2, this terminal being an acquisition interface of test data EPR to be compared to the secret control data CTRL.

As is known, the terminal 2 proceeds with acquisition of test data such as authentication data AUTH to be compared to the secret control data CTRL. By way of non-limiting example, an individual can compose a code corresponding to the authentication data AUTH, for comparison with a PIN code.

The terminal 2 then communicates to the processor 11 the test data EPR, and the processor compares said data to the secret control data CTRL. In the case of an authentication method, correspondence between the secret data and the test data ensures authentication of the individual and triggers execution by the processor of a predetermined program 11. This correspondence authorises access by the individual to a dedicated service, which in the case of a smart card and by way of a non-limiting example can be a payment service, or access to a telephony service, etc.

The memory 12 of the authentication system 1 also stores additional secret data $ADD_1, \ldots, ADD_N$, separate from the secret control data CTRL.

In contrast to the secret control data CTRL these data do not allow carrying out authentication or authorise access to a particular service. Their role is explained in reference to FIG. 2 described hereinbelow.

The Authentication Method

Figure 2:
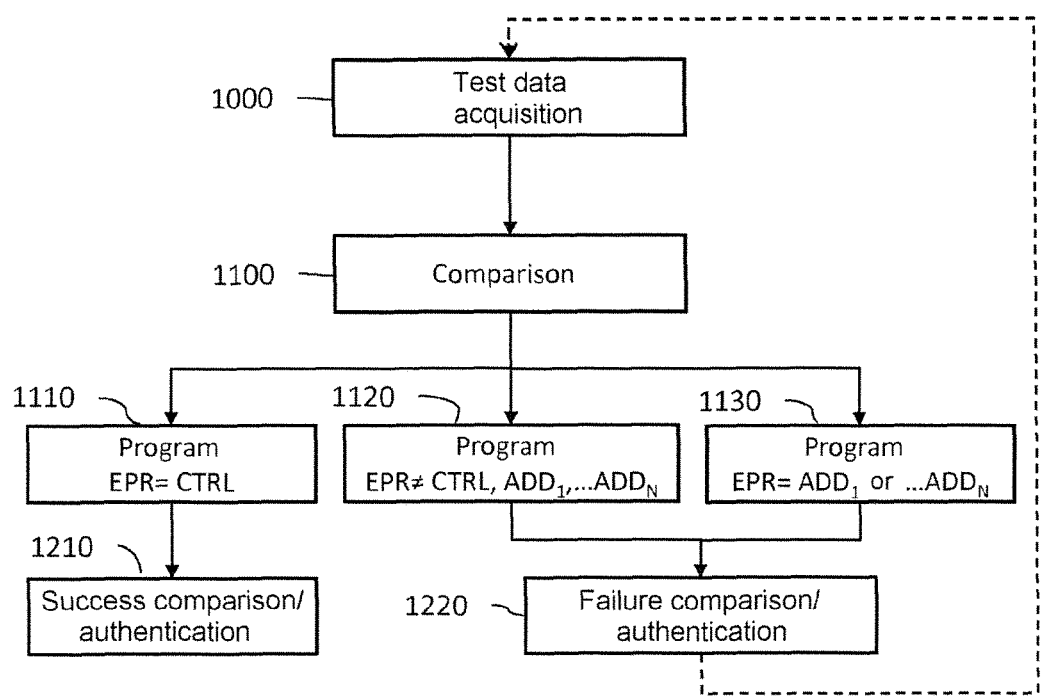
FIG. 2 illustrates the main steps of an embodiment of the method.

FIG. 2 illustrates the main steps of the method according to the invention. The first step 1000, mentioned earlier, is acquisition by the processor 11 of test data EPR, by way of acquisition and transmission via terminal 2.

The processor then compares the test data EPR to the secret control data CTRL, as well as to all the additional secret data $ADD_1, \ldots, ADD_N$.

It runs a comparison operation 1110 on the secret control data CTRL.

Now, during or after the comparison step the processor 11 is adapted to carry out operations which generate a variation in its performance which is a function of the test data EPR it receives at input.

Therefore, an outside observer cannot distinguish the performance of the component 1 according to whether or not there is success from the comparison 1110.

A possible though non-limiting realisation is described hereinbelow in reference to FIG. 2.

In case of correspondence between the secret control data CTRL and the test data EPR—excluding the possibility of correspondence between the test data EPR and any of the additional secret data $ADD_1, \ldots, ADD_N$—the processor runs a determined program corresponding to the success of comparison 1210, for example authentication.

At the same time as or following this comparison 1110 or this authentication 1210, the processor also runs complementary operations linked to the additional secret data $ADD_1, \ldots, ADD_N$, especially for example comparisons between the test data EPR and any of the additional secret data $ADD_1, \ldots, ADD_N$.

In case of correspondence between the test data EPR and any of the additional secret data $ADD_1, \ldots, ADD_N$, the processor runs particular programs dedicated to these additional secret values. In this way, the external performance of the component is now modified, even if this is not about authentication or success of the comparison between the test data and the control data.

In this way, an attacker who might observe electricity consumption of the component 1 during the comparison step could consider that the particular current consumption profile of the component 1 originates from a program run in case of authentication. He would therefore deduce that the entered test data EPR corresponds to the secret control data CTRL, and would be caused in error.

The electronic component can be of the type in which a meter is connected to the comparison step, the meter being initialised at a strictly positive value N, and decremented at each lack of correspondence between the test data EPR and the secret control data CTRL, with execution of the comparison step being prohibited if the value of the meter is zero.

This case is adapted particularly in terms of authentication by comparison between a secret PIN key and an identification datum AUTH.

In this case, to boost protection conferred on the control secret key, at least N additional secret data $ADD_1, \ldots, ADD_N$ are preferably provided. So if the lure linked to the program run in case of correspondence between the authentication data and the additional secret data is operating, the attacker can iterate authentication attempts as many times as there are additional secret data, with successive failures causing decrementation of the meter until it cancels out.

Also, this lure is all the more effective if the program run in case of correspondence between the secret control data PIN and the authentication data AUTH engenders variations in the electric signals similar to those of the electric signals generated by the program run in case of lack of correspondence between the authentication data AUTH and any one of the secret keys CTRL, $ADD_1, \ldots, ADD_N$.

Inversely, variations in electric signals in case of correspondence between the secret control data CTRL and the test data EPR can be similar to the variations on the electric signals in case of correspondence between the test data EPR and the additional secret data $ADD_1, \ldots, ADD_N$.

In the first case, the secret control data CTRL are confused with the additional data disallowing authentication or success of the comparison. In the second case, the secret control data CTRL are confused with the additional secret keys, that is, they cannot be identified from these keys. In this latter case, it is preferable to provide a number much greater than N, for example of the order of 10 to 100 times N, of additional secret data.

These embodiments of the method are not however limited to an electronic component comprising a meter connected to the comparison step.

Finally, to make identification of secret control data CTRL even more difficult, those programs run during or after comparison step 1100 can comprise wait steps during random deadlines.

Accordingly, even if programs run in case of correspondence or not between the secret control data CTRL and the test data EPR are not identical, the specificity of the authentication program 1110 can be masked by these random deadlines.

An easy authentication execution method has therefore been developed, which is securer than methods developed previously, and is less expensive in calculation time than the prior art.

The invention claimed is:

1. A secure comparative treatment method performed by an electronic component including a processor and a memory which stores secret control data and additional secret data different from the secret control data, the method comprising the steps of:
   initializing a counter at a positive value N,
   the processor comparing test data it receives as an input to said secret control data stored in said memory, and at the same time, the processor comparing the test data with said additional secret data,
   wherein in case of correspondence of the test data with the secret control data, the processor executes a first program, generating on the electronic component a first variation in performance, and
   in case of correspondence of the test data with any of the additional secret data, the processor executes a second program specific to said additional secret data, said second program generating on the electronic component a second variation in performance, wherein each variation in performance comprises a variation in electric energy consumption of the electronic component, and wherein said processor comparing includes, after each said comparing, decrementing the counter by one unit at each lack of correspondence, checking said counter for its current value, when said current value reaches zero, inhibiting said comparing.

2. The method according to claim 1, further comprising the processor performing at least one wait time function of test data at an input of the electronic component.

3. The method according to claim 1, further comprising performing at least one wait time function of test data at an input of the electronic component, and at least one complementary wait time operation following a comparison operation, in case of correspondence between test data provided at an input of the electronic component and the secret control or additional secret data.

4. The method according to claim 1, in which the number of codes constituting additional secret data is strictly greater than N.

5. An electronic authentication component comprising a memory in which a secret control data and additional secret data are stored, and a processor, wherein the processor is programmed to execute instructions which:

initialize a counter at a positive value N, compare test data received at an input to said secret control data stored in said memory, and in case of correspondence of the test data with the secret control data, run a first program, said program generating on the electronic component a first variation in performance, and at the same time as said comparison with the secret control data, compare said test data received at an input to said additional secret data, and in case of correspondence of the test data with any of the additional secret data, run a second program specific to said additional secret data, said second program generating on the electronic component a second variation in performance, wherein each variation in performance comprises a variation in electrical energy consumption of the electronic component, and wherein the instructions which compare include:

after each said test data compare, decrementing the counter by one unit at each lack of correspondence, checking said counter for its current value, when said current value reaches zero, inhibiting said test data compare.

6. The method defined by claim 1 wherein said additional secret data corresponds to a plurality of codes, and N is selected to be at least the number of codes corresponding to the additional secret data.

* * * * *